US007118033B2

(12) United States Patent
Merkert, Sr.

(10) Patent No.: US 7,118,033 B2
(45) Date of Patent: Oct. 10, 2006

(54) ACCESS SYSTEM

(75) Inventor: Robert J. Merkert, Sr., Voorhees, NJ (US)

(73) Assignee: SCM Microsystems, Inc., Fremont, CA (US)

( * ) Notice: Subject to any disclaimer, the term of this patent is extended or adjusted under 35 U.S.C. 154(b) by 1 day.

(21) Appl. No.: 10/870,475

(22) Filed: Jun. 16, 2004

(65) Prior Publication Data

US 2005/0082365 A1 Apr. 21, 2005

(30) Foreign Application Priority Data

Jun. 16, 2003 (DE) ................................ 203 09 254

(51) Int. Cl.
*G06K 5/00* (2006.01)

(52) U.S. Cl. ........................ 235/382; 235/375; 340/5.2

(58) Field of Classification Search ................ 235/375, 235/380, 382, 492; 340/5.1–5.2, 5.14, 5.26, 340/5.33, 5.4, 5.53

See application file for complete search history.

(56) References Cited

U.S. PATENT DOCUMENTS

| | | | | |
|---|---|---|---|---|
| 5,475,378 | A | 12/1995 | Kaarsoo et al. | |
| 5,517,172 | A | 5/1996 | Chiu | |
| 5,679,945 | A * | 10/1997 | Renner et al. | 235/492 |
| 5,995,630 | A | 11/1999 | Borza | |
| 6,102,286 | A * | 8/2000 | Hammond | 235/380 |
| 6,223,984 | B1 * | 5/2001 | Renner et al. | 235/380 |
| 6,532,298 | B1 | 3/2003 | Cambier et al. | |
| 2002/0110242 | A1 | 8/2002 | Bruwer | |
| 2002/0174357 | A1 | 11/2002 | Davis et al. | |
| 2003/0014642 | A1 | 1/2003 | Martinsson et al. | |
| 2003/0098778 | A1 * | 5/2003 | Taylor et al. | 340/5.61 |
| 2003/0117263 | A1 * | 6/2003 | Gonzales et al. | 340/5.61 |
| 2003/0200446 | A1 | 10/2003 | Siegel et al. | |
| 2003/0215114 | A1 * | 11/2003 | Kyle | 382/115 |
| 2005/0127172 | A1 | 6/2005 | Merkert, Sr. | |

FOREIGN PATENT DOCUMENTS

| | | | |
|---|---|---|---|
| EP | 1 237 091 | A1 | 9/2002 |
| KR | 2002 073 716 | A | 9/2002 |
| WO | WO 01/27723 | A1 | 4/2001 |

OTHER PUBLICATIONS

PCT International Search Report for PCT International Application No. PCT/US2004/016616, mailed Oct. 20, 2004, received Oct. 26, 2004, 4 pages.

PCT International Search Report for PCT International Application. No. PCT/2004/033926, mailed Feb. 24, 2005, received Feb. 28, 2005, 7 pages.

* cited by examiner

*Primary Examiner*—Thien M. Le
*Assistant Examiner*—Kristy A. Haupt
(74) *Attorney, Agent, or Firm*—Finnegan, Henderson, Farabow, Garrett & Dunner, L.L.P.

(57) ABSTRACT

An access system includes an input device which is accessible to a user and capable of reading an authentication and/or identification information provided by the user. The access system further includes a Wiegand control panel (12) connected to the input device for evaluation of the information provided by the user. The control panel (12) is located in a secure area (14) remote from the input device. The access system further includes a converter (18) connected to the input device and to the control panel (12). The input device includes encryption means to encrypt the information provided by the user. The converter (18) is capable of converting the encrypted information into a standard Wiegand signal.

14 Claims, 2 Drawing Sheets

ACCESS SYSTEM

This application claims the right to foreign priority based on German Patent Application No. 203 09 254.6, entitled "ACCESS SYSTEM," filed in the Federal Republic of Germany, on Jun. 16, 2003, which is hereby incorporated herein by reference.

The invention relates to an access system, comprising an input device which is accessible to a user and capable of reading an authentication and/or identification information provided by the user, and a Wiegand control panel connected to the input device for evaluation of the information provided by the user, the control panel being located in a secure area remote from the input device.

Security systems using Wiegand readers and control panels adapted to evaluate the data read from a Wiegand card are well known and widely employed in various applications like systems for unlocking doors or parking garage gates etc. Usually, the Wiegand reader is located to be accessible to the user (Wiegand card holder) while the control panel, which after a positive evaluation of the data performs a security relevant operation (e.g. unlocking a door) is located in a an area which is not accessible to the user, e.g. in a closed room, to guarantee a certain level of security.

U.S. Pat. No. 5,679,945 shows an access system of the type mentioned in the beginning which provides an "intelligent" card reader in order to replace existing magnetic stripe readers, bar code readers and Wiegand readers without the need for retrofitting of existing computer systems which are coupled to the existing readers.

The invention provides an access system with an extremely high level of security.

This object of the invention is attained with a security system of the type mentioned in the beginning wherein the access system further comprises a converter connected to the input device and to the control panel, the input device comprising encryption means to encrypt the information provided by the user, and the converter being capable of converting the encrypted information into a standard Wiegand signal. Thus, the access system provides a higher level of security because the data read from the input device is transferred in an encrypted form. Moreover, the system offers more flexibility because it is not limited to Wiegand readers as input devices, while the existing Wiegand control panels can still be used.

Preferably the converter is co-located with the control panel in the secure area. In this configuration there is no chance to intercept and abuse the information This guarantees an even higher security with regard to the data transfer from the input device to the control panel because it is not possible to intercept and abuse the authentication/identification information provided by the user since the information is encrypted until it reaches the converter which, together with the control panel, is located in the secure area which is not accessible to a fraud. In other words, a secure communication channel between the input device and the securely located converter is provided.

The input device preferably comprises a smart card reader into which a secure output can be implemented, for example a RS485 or a TCP/IP output.

According to a preferred embodiment of the invention the access system further comprises a host computer connected to and located remote from the input device. Preferably, the host computer is also connected to the control panel and the data between the input device and the host computer is transmitted using a RS485 or a TCP/IP protocol.

Thus, the remote host computer may be an existing access control system host computer which, after a slight modification and/or addition to the system software, can be used to configure and to control the input device in a secure manner.

Further details of the invention become apparent from the following description in connection with the accompanying drawings. In the drawings.

Figure 1:
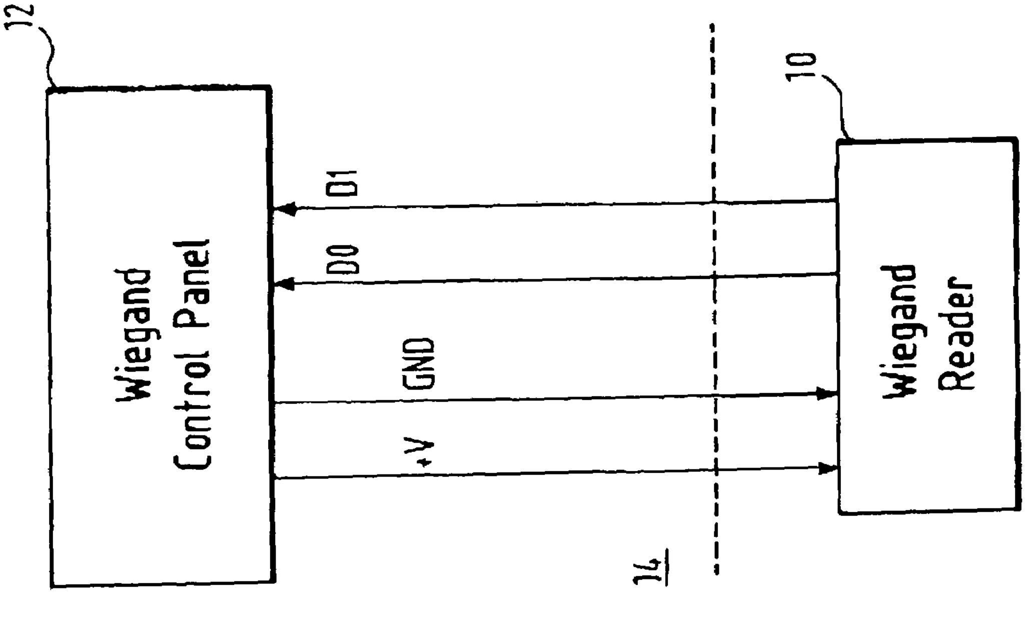
FIG. 1 shows an access system according to the prior art.

The prior art access system illustrated in FIG. 1 includes a standard Wiegand reader 10 and a Wiegand control panel 12 adapted to retrieve data from a standard Wiegand reader. The control panel 12 is located in a secure area 14 remote from the Wiegand reader 10, which is accessible to a user. In order to gain access the user inserts his Wiegand card (not shown), which contains authentication and, if required, identification information, into the Wiegand reader 10. The information is transmitted from the reader 10 to the control panel 12 where the information is evaluated. Depending on the result of the evaluation the control panel 12 either performs a security relevant operation, e.g. unlocking a door or the like, to grant the user the requested access, or it denies such operation.

Figure 2:
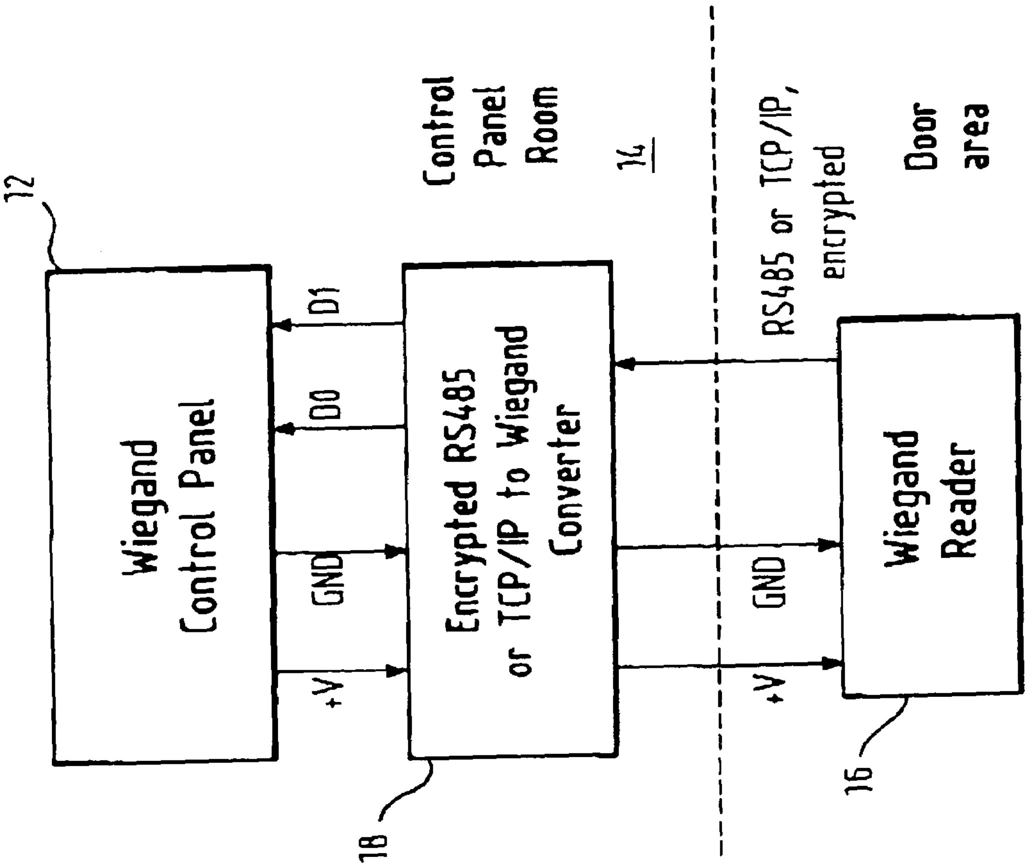
FIG. 2 shows an access system according to an embodiment of the invention.

The embodiment of the invention shown in FIG. 2 also makes use of a Wiegand control panel 12. (It has to be understood that the term "Wiegand control panel" is not restricted to a particular hardware configuration but rather includes any suitable control panel which is capable of processing signals/data in a Wiegand format by using corresponding software.) However, the standard Wiegand reader is replaced by another input device, in particular a smart card reader 16 into which a smart card (not shown) containing the authentication/identification information can be inserted. The smart card reader 16 includes means for encrypting the information stored on the smart card and an RS485 or a TCP/IP output. The access system according to the invention further comprises a converter 18 connected both to the smart card reader 16 and to the control panel 12. The converter 18 and the control panel 12 are co-located in a secure area 14 remote from the smart card reader 16 and have a direct interface connection.

The operation of the access system of FIG. 2 will now be described. The user inserts his smart card into the smart card reader 16. The information on the smart card is read and encrypted by the encryption means of the smart card reader 16. The encrypted information is transmitted to the converter 18 using a secure RS485 or TCP/IP protocol. Thus, the connection between the smart card reader 16 and the converter 18 can be regarded as a "secure channel". The converter 18 converts the encrypted information into a standard Wiegand signal and sends it to the control panel 12. The control panel 12 is able to evaluate the Wiegand signal and decides whether to allow or to deny access.

Figure 3:
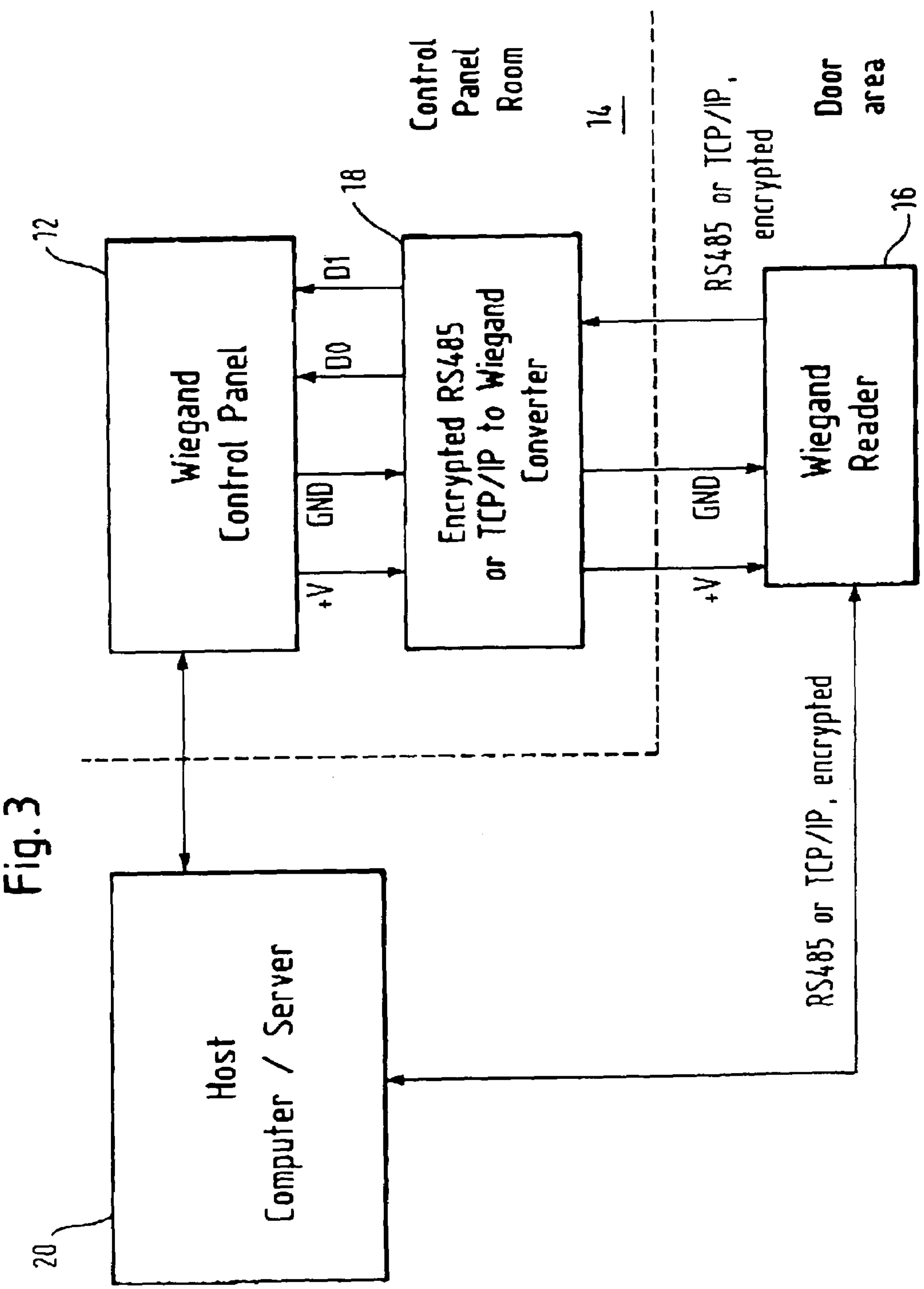
FIG. 3 shows an enhanced access system according to a further embodiment of the invention.

FIG. 3 depicts a further embodiment of the invention which has substantially the same configuration as the embodiment of FIG. 2, but further includes a remote host computer 20 which is connected both to the input device, preferably a smart card reader 16, and to the control panel 12. The host computer 20 is located outside the secure area 14 of the control panel 12 and the converter 18. The communication between the host computer 20 and the smart card reader 16 is provided by a further secure channel, i.e. data is transferred using an RS485 or a TCP/IP protocol.

The operation of the access system of FIG. 3 to gain access is the same as described above. However, the access system can easily be adapted to various requirements. For example, the secure channel between the remote host computer 20 and the smart card reader 16 is be used to change the configuration of the smart card reader 16 on command from the host computer 20 in a comfortable and secure manner. Moreover, the host computer 20 can be used to define the type of input device that is required to gain access. Suitable input devices include contactless smart card reader, contact smart card reader, PIN pad, biometric device (e.g. fingerprint reader) and combinations thereof. The input devices required can be changed as a function of security threat level, day of week, time of day, or other conditions. The connection between the host computer 20 and the control panel 12 allows to check whether a control panel operation has been successfully executed. Further, the host computer 20 can be used to identify a possible malfunction of the control panel 12 by using test signals.

It has to be understood that the invention is not limited to embodiments using an RS485 or TCP/IP protocol. The communication through the secure channels may be provided by any other suitable protocol.

The invention claimed is:

1. An access system, comprising an input device which is accessible to a user and capable of reading an authentication and/or identification information provided by the user and encrypting the information provided by the user; control panel for evaluation of the information provided by the user, the control panel being located in a secure area remote from the input device and capable of processing data or signals in a Wiegand format; and a converter connected to the input device and to the control panel and being capable of converting the encrypted information into a standard Wiegand signal;

characterized in that the access system further comprises a host computer connected to and located remote from the input device; and further characterized in that the host computer:

is also connected to the control panel;

defines a type of input device required to gain access; and changes the type of input device required to gain access.

2. The access system according to claim 1, characterized in that the converter is co-located with the control panel in the secure area.

3. The access system according to claim 1, characterized in that the input device comprises a smart card reader.

4. The access system according to claim 1, characterized in that the input device comprises at least one of a PIN pad and a biometric device.

5. The access system according to claim 1, characterized in that the encrypted information is transmitted from the input device to the converter using one of a RS485 and a TCP/IP protocol.

6. The access system according to claim 1, characterized in that the data between the input device and the host computer is transmitted using one of a RS485 and a TCP/IP protocol.

7. The access system according to claim 1, characterized in that the control panel is a Wiegand control panel.

8. The access system according to claim 3, characterized in that the smart card reader is a contactless smart card reader.

9. The access system according to claim 3, characterized in that the smart card reader is a contact smart card reader.

10. The access system according to claim 1, characterized in that the host computer defines a plurality of types of input devices required to gain access.

11. An access system, comprising an input device which is accessible to a user and capable of reading an authentication and/or identification information provided by the user and encrypting the information provided by the user; control panel for evaluation of the information provided by the user, the control panel being located in a secure area remote from the input device and capable of processing data or signals in a Wiegand format; and a converter connected to the input device and to the control panel and being capable of converting the encrypted information into a standard Wiegand signal;

characterized in that the access system further comprises a host computer connected to and located remote from the input device; and further characterized in that the host computer:

is also connected to the control panel;

changes the plurality of type of input device required to gain access.

12. The access system according to claim 1, characterized in that the host computer has verification means for verifying that a control panel operation has been successfully executed.

13. The access system according to claim 1, characterized in that the host computer has identification means for identifying a malfunction of the control panel.

14. The access system according to claim 13, characterized in that the identification means use test signals.

* * * * *

UNITED STATES PATENT AND TRADEMARK OFFICE

CERTIFICATE OF CORRECTION

PATENT NO. : 7,118,033 B2
APPLICATION NO. : 10/870475
DATED : October 10, 2006
INVENTOR(S) : Robert J. Merkert, Sr.

It is certified that error appears in the above-identified patent and that said Letters Patent is hereby corrected as shown below:

In claim 11, column 4, line 37, after "control panel," start new paragraph and insert:

--defines a plurality of types of input devices required to gain access; and--

Signed and Sealed this

Ninth Day of January, 2007

JON W. DUDAS
*Director of the United States Patent and Trademark Office*